V. RULLO.
BREAD CUTTER.
APPLICATION FILED JULY 23, 1920.

1,369,548.

Patented Feb. 22, 1921.
3 SHEETS—SHEET 1.

ON LINE 2-2. FIG. 1.

INVENTOR
Vincenzo Rullo.
BY
ATTORNEYS

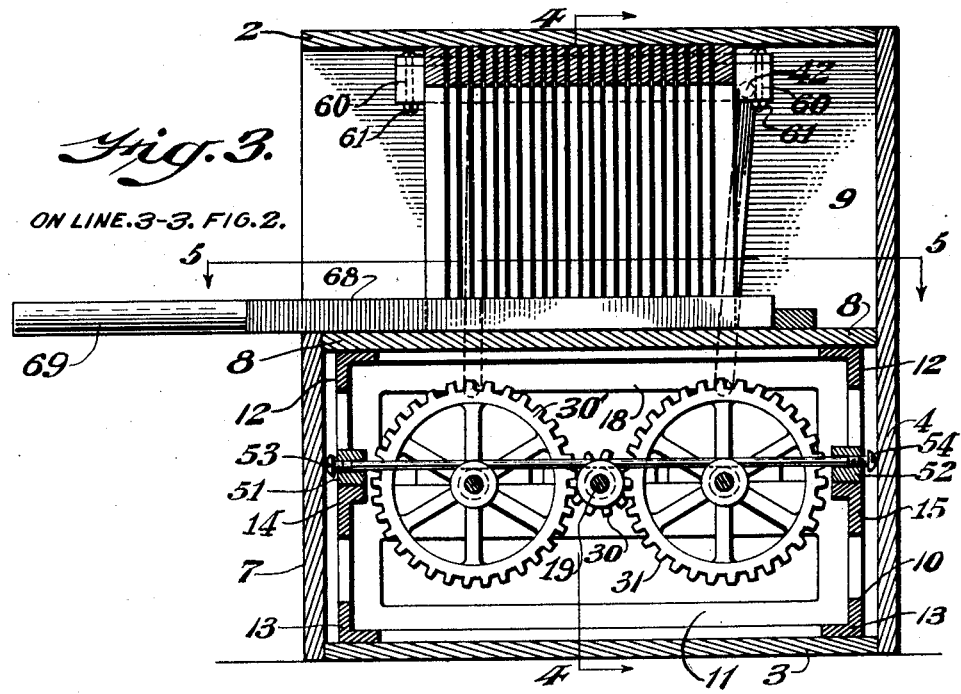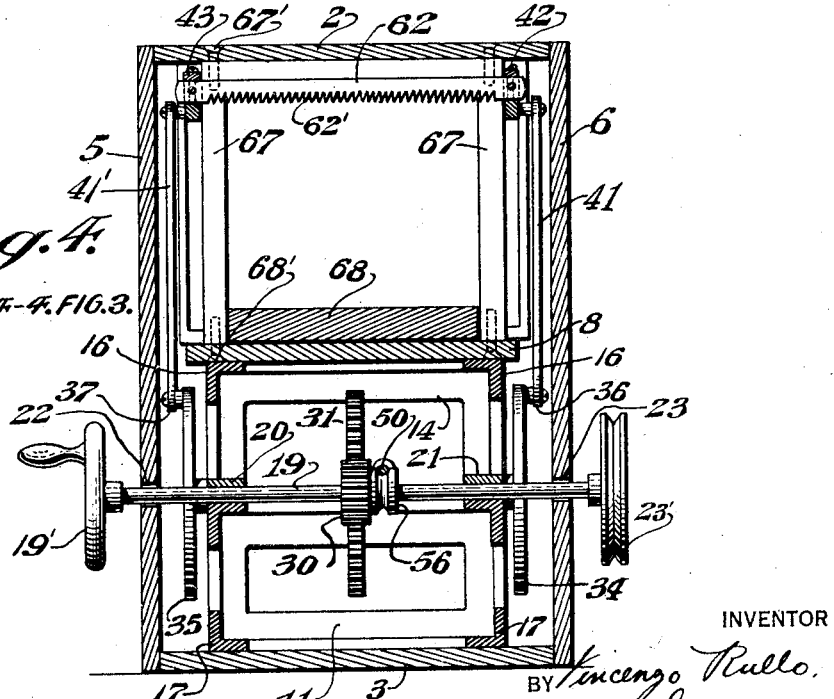

V. RULLO.
BREAD CUTTER.
APPLICATION FILED JULY 23, 1920.
1,369,548.
Patented Feb. 22, 1921.
3 SHEETS—SHEET 3.
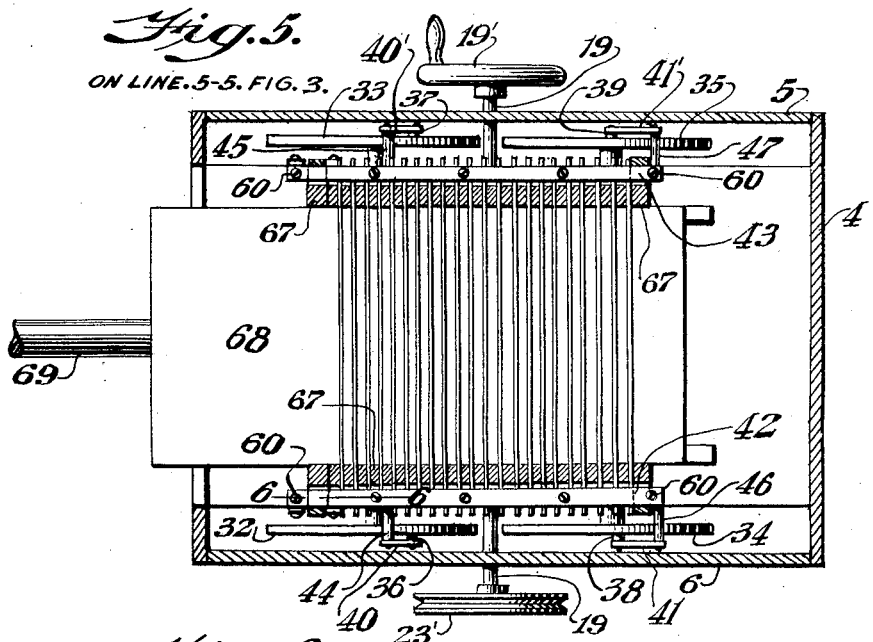
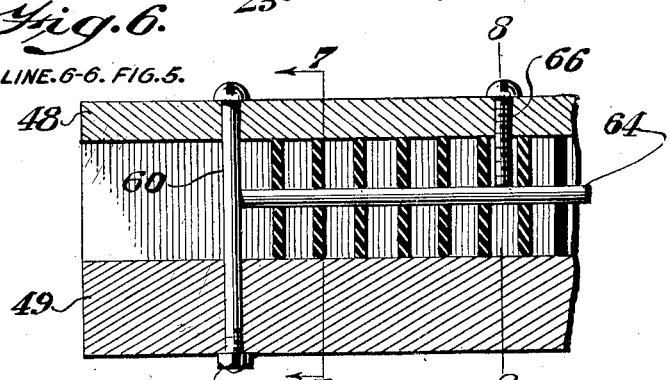
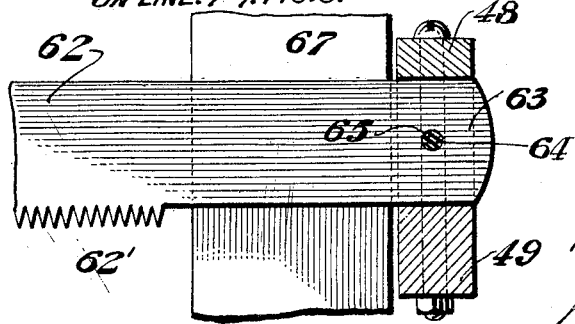
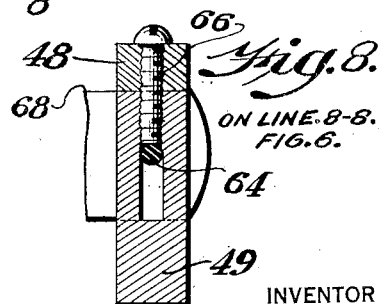
INVENTOR
Vincenzo Rullo.
BY
ATTORNEYS

UNITED STATES PATENT OFFICE.

VINCENZO RULLO, OF PHILADELPHIA, PENNSYLVANIA.

BREAD-CUTTER.

1,369,548. Specification of Letters Patent. Patented Feb. 22, 1921.

Application filed July 23, 1920. Serial No. 398,434.

*To all whom it may concern:*

Be it known that I, VINCENZO RULLO, a subject of the King of Italy, residing in the city and county of Philadelphia, State of Pennsylvania, have invented a new and useful Bread-Cutter, of which the following is a specification.

My invention relates to cutting or slicing machines and more particularly to one which is adapted for the cutting of bread, cake or similar material in loaf form.

One of the objects of my invention is to devise a novel construction of a cutting or slicing machine which is adapted to cut, in a single operation, one or more loaves of bread, cake or similar material in loaf form in slices of uniform and equal thickness.

Another object of my invention is to devise a novel construction of a cutting or slicing machine for bread, cake and the like, with provision for varying the distance between the cutting knives.

With the above and other objects in view as will hereinafter more clearly appear, my invention comprehends a novel cutting and slicing machine.

It further comprehends a novel construction and arrangement of a casing, cutting mechanism, and actuating means for the cutting mechanism.

It further comprehends novel means for securing a gear train in its proper alinement.

Other novel features of construction and advantage will hereinafter more clearly appear in the detailed description of the invention.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 3 represents a view taken on the line 3—3 of Fig. 1.

Fig. 4 represents a view taken on the line 4—4 of Fig. 3.

Fig. 5 represents a view taken on the line 5—5 of Fig. 3.

Fig. 6 represents a view taken on the line 6—6 of Fig. 5.

Figure 1:
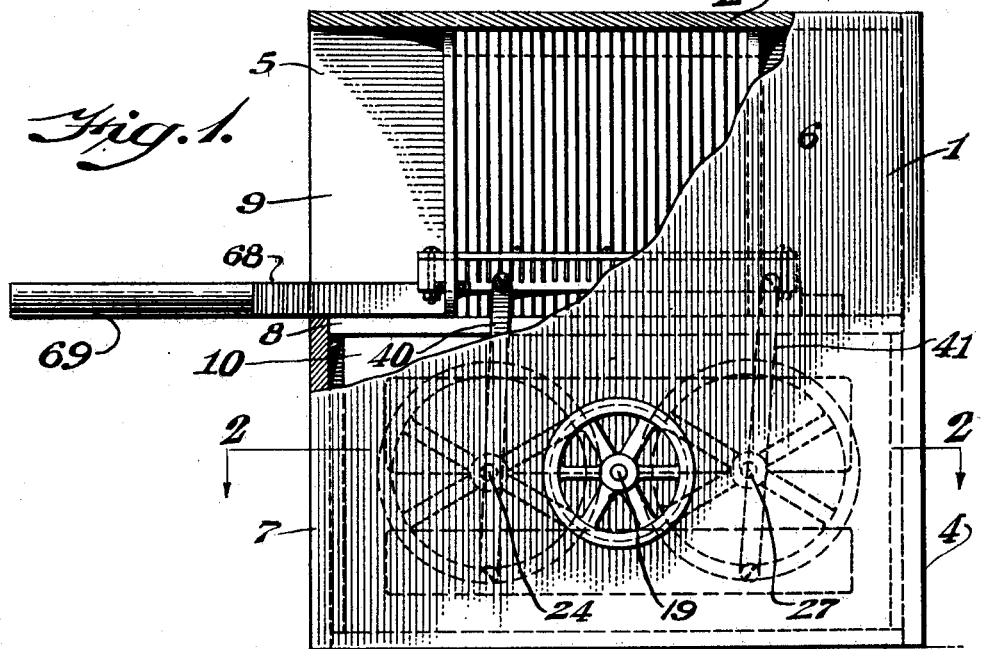
Figure 1 represents in side elevation, a cutting and slicing machine embodying my invention, a portion of the casing being broken away for the sake of clearness of illustration.

Figs. 7 and 8 are views taken on the lines 7—7 and 8—8 of Fig. 6, respectively.

Similar numerals of reference indicate corresponding parts.

Referring to the drawings:—

1 designates a housing or casing of a slicing or cutting mechanism and its operating means, the said casing comprising a top 2, bottom 3, rear wall 4 and sides 5 and 6 respectively. A front wall 7 and a partition or floor 8 divide the casing into an upper chamber 9 and a lower chamber 10, the upper chamber being open at its front. The bottom 3 supports a rectangular open frame 11 within the lower chamber. The frame consists of transverse top and bottom angle bars 12, and 13, connected by front and rear vertical open end plates 14 and 15 and longitudinal angle plates 16 and 17 connected by open side plates 18.

The sides of the frame 11 carry and support intermediately of their ends, a revolving shaft 19, said shaft being mounted in bearings 20, 21 and extending through alined apertures 22, 23 in the sides 5 and 6 respectively of the casing. A hand operating wheel 19' is mounted on one end of the shaft 19 and a grooved fly wheel 23' which may be belt or motor driven is mounted on the opposite end of the said shaft 19. The frame 11 also carries and supports a front shaft 24 mounted in suitable bearings 25, 26 and a rear shaft 27 also mounted in bearings 28, 29 which will be more clearly seen in Fig. 2. A pinion 30 mounted on the shaft 19 meshes with the gears 30 and 31, said gears being mounted on the shafts 24 and 27 respectively, thus driving the same when the shaft 19 is operated.

Figure 2:
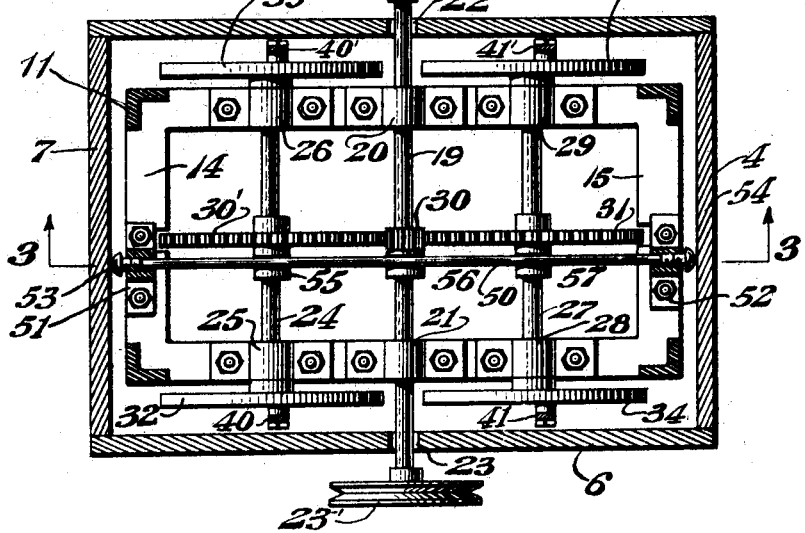
Fig. 2 represents a view taken on the line 2—2 of Fig. 1.

A longitudinally bearing rod 50 lies in the brackets 51 and 52 and is secured in place by the screws 53 and 54 respectively, said brackets being fastened to the end plates 14 and 15 of the lower chamber 10, see Figs. 2 and 3.

The rod 50 is seated in the grooved collars 55, 56, 57 contiguous with the gears 30, 30' and 41, and the said collars are also mounted on the shafts 24, 19 and 27 respectively, the rods thereby retaining the gears in axial alinement when the screw elements are tightened.

32 and 33 designate eccentrics mounted on the ends of the shaft 24 which projects on each side of the frame 11, and corresponding eccentrics 34, 35 are also mounted on the ends of the rear shaft 27. The pins, 36, 37 at the outer face of the eccentrics 32, 33 and the pins 38, 39 at the outer face of the eccentrics 34, 35 are connected by the eccentric rods 40, 41, which are connected to a cross head carrying the knives or cutters hereinafter to be described.

It will be obvious at this point, that as the shaft 19 is operated, the pinion thereon will mesh with gears 30', 31, thereby revolving the same and their respective shafts carrying the eccentrics. The eccentrics are connected by the eccentric rods to the cross head carrying the knives.

The eccentric rods 40 and 41 of the eccentrics 32 and 34 are connected at the top end to the cross head 42 by the pins 44 and 46 respectively. The opposite eccentric rods 40' and 41' of the eccentrics 33 and 35 are connected to the cross head 43 by the pins 45 and 47 respectively.

The cross heads 42 and 43, comprising the top and bottom strips 48 and 49 respectively, are secured by the bolts 60 having the nut 61 threaded thereon. The cross heads are adapted to carry a plurality of transverse cutting knives 62, which have the cutting teeth 62' which may be more clearly seen in Figs. 4 and 7, said knives being held in position at their ends 63 by a longitudinally extending rod 64 which passes through the apertures 65 of the side walls 63. The set screws 66 are used for the purpose of retaining the rods in their proper alinement.

The U-shaped guides 67 are secured to the partition 8 by the screws 68' and to the top of the casing by the screws 67'. These guides are spaced between the cutting knives 62 and guide said knives during their cutting operation. In order to regulate the thickness of the slice, the set screws 66 are removed also, the bolts 60 thus leaving the top portion 48 of the cross head unsecured. This portion is removed and also the extending rods 64. The desired knives 62 may now be removed according to the thickness of cut required.

A rectangular cutting board 68 having a handle portion 69 carries the food or article to be cut, it being apparent that the board is slid into the opening of the upper chamber beneath the knives before they are actuated. When the article is cut the board carrying it is of course removed.

In the operation of the machine, one or more loaves, of bread for example, are placed on the board 68 which is inserted into the upper chamber beneath the knives. The revolution of the hand wheel 19' operates the shaft 19 carrying the pinion 30. The pinion drives the larger gears 30', 31 and their respective shafts 24 and 27. These shafts, carrying the eccentrics 32, 33, 34 and 35 operate the eccentric rods 40, 41, and 40', and 41' connected to the cross head's sides 42, 43, whereby the knives carried by the cross head are actuated between the vertical guides 67. As the eccentrics revolve, they are of course raised and lowered to effect the vertical cutting action of the knives 62. When it is desired to vary the width of the cut the screws 60 and 66 of the cross head are removed, the top portion 48 of the cross head is also removed and the rods 64 withdrawn from the apertures of the knives and certain of said knives are then removed, as desired. The gearing and operating mechanism are inclosed within the outer casing which is open at its front upper side to permit the insertion of the board carrying the bread or cake to be cut.

While I have shown a preferred embodiment of my invention and a practical manner in which I propose to practice the same, I do not wish to be limited or restricted to the exact details of construction shown, but reserve the right to all such modifications, alterations and equivalents shown and described, as may fall within the scope of what I claim.

Having thus described my invention, what I claim as new and desire to secure by Letters Patent, is:—

1. In a machine of the class described, a frame, stationary spaced guides supported thereby, a cross head in proximity to said guides, a plurality of removable knives carried by said cross head, apertures in the ends of said knives, rods passing through said apertures for retaining said knives in said cross head, means for actuating said knives between said guides, and a casing having an opening through which the article to be cut may be inserted beneath said knives.

2. In a machine of the class described, a frame, stationary guides supported by said frame, a cross head, a plurality of vertically movable knives carried by said cross head and between said guides, said knives being apertured, rods passing through said apertures for retaining said knives in said cross head, set screws for retaining said rods in proper alinement, means for spacing said knives within said cross head, actuating means for said cross head, a casing for said cutting and actuating mechanism, and having an opening through which the article to be cut may be inserted to position it.

3. In a machine of the class described, a frame, vertical guides supported by said frame, a cross head, a plurality of removable knives secured in said cross head and movable between said guides, actuating means for reciprocatively operating said knives, said actuating means comprising a plurality of driven members, gearing on said driven members, a rod for keeping said gears in axial alinement, and a casing inclosing said cutting mechanism and said actuating means.

VINCENZO RULLO.

Witnesses:
H. S. FAIRBANKS,
C. D. McVAY.